J. H. FROME.
EDUCATIONAL APPLIANCE.
APPLICATION FILED MAY 23, 1919.

1,329,896.

Patented Feb. 3, 1920.
2 SHEETS—SHEET 1.

WITNESSES
Eugene A. Wilson

INVENTOR
JOHN. H. FROME
BY
ATTORNEYS

UNITED STATES PATENT OFFICE.

JOHN H. FROME, OF PHILADELPHIA, PENNSYLVANIA.

EDUCATIONAL APPLIANCE.

1,329,896.  Specification of Letters Patent.  Patented Feb. 3, 1920.

Application filed May 23, 1919. Serial No. 299,150.

*To all whom it may concern:*

Be it known that I, JOHN H. FROME, a citizen of the United States, and a resident of Philadelphia, in the county of Philadelphia and State of Pennsylvania, have invented a new and Improved Educational Appliance, of which the following is a full, clear, and exact description.

The object of the invention is to provide a new and improved educational appliance more especially designed as an aid in teaching a native, or a foreign language, or both. Another object is to enable a teacher to readily set up sentences for study by the pupils without requiring blackboard work or the like.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1:
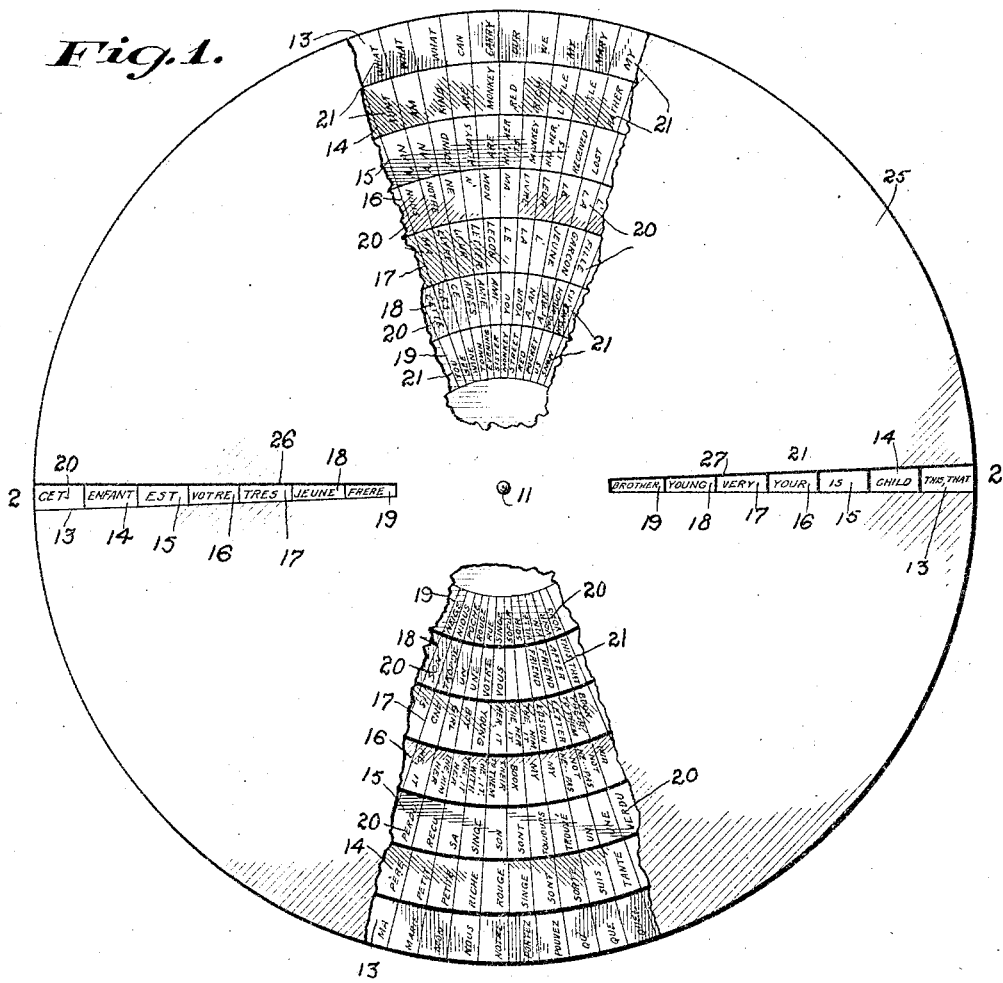
Figure 1 is a plan view of the educational appliance with parts shown broken out and arranged as an aid in teaching French.
Figure 2:
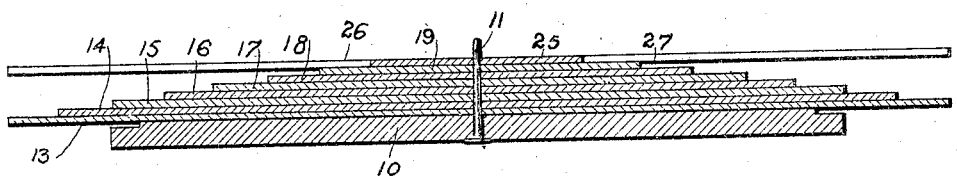
Fig. 2 is a sectional side elevation of the same on the line 2—2 of Fig. 1.

In a suitably constructed base 10 is arranged a pivot 11 engaging centrally a series of disks 13, 14, 15, 16, 17, 18 and 19 superimposed one upon the other and of different diameters to provide concentric bands each having printed or otherwise produced thereon two sets of words 20 and 21 approximately of the same height and disposed radially, the words 20, on one-half portion of each band, being in one language, say French, while the words 21 are arranged radially on the other half portion of a band and are in English, diametrically opposite words on the same band being a translation one of the other. The words 20 on each band are arranged with the initials in alphabetical order to permit of quickly assembling the necessary words for a given French sentence, as hereinafter more fully explained. The disks are overlaid by a cover 25 held centrally on the pivot 11 and provided with diametrically opposite slots 26 and 27 disposed radially and of a width corresponding approximately to the height of the words 20 and 21 so that only one of the words 20 or 21 on each band can appear at a time in the corresponding slot 26 or 27. As shown at Fig. 1, the largest bottom disk 13 discloses the word "Cet" in the slot 26 and the words "This that" appear in the outer end of the slot 27 and are the translation of "Cet." The next disk 14 discloses the word "Enfant" in the slot 26 and the word "Child" in he slot 27, one being a translation of the other. Similar words appear in the slots 26, 27 relative to the other disks 16, 17, 18 and 19, and the several words in the slot 26 make one sentence "Cet enfant cest votre tres jeune frere" and the corresponding sentence in the slot 27 is a translation of the French sentence, but is read from the right to the left, "Brother young very your is child this." It will be noticed that by the user turning the disks 13 to 19 by reaching under the cover 25 any desired sentence can be composed within the range of the words on the several disks, it being understood that the sentence appearing in French in the slot 26 is a translation of the English sentence in the slot 27 or vice versa.

Figure 3:
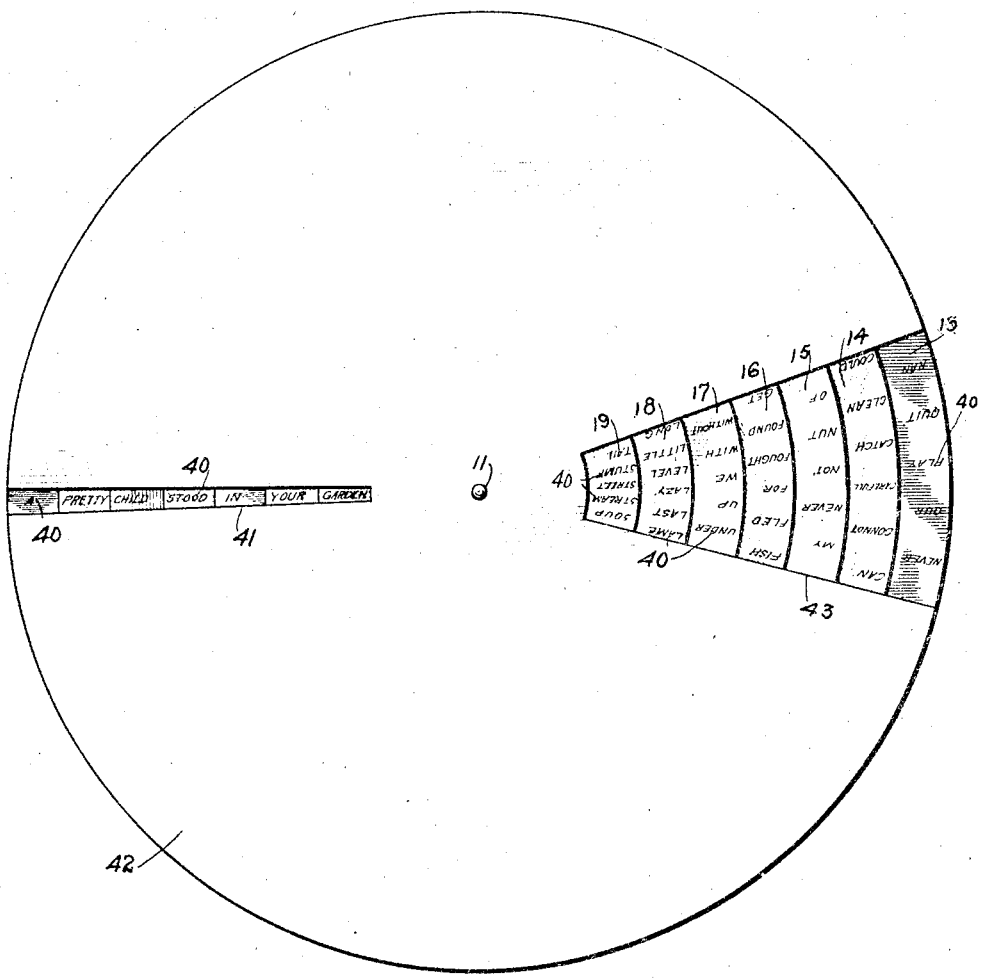
Fig. 3 is a plan view of the educational appliance arranged as an aid for teaching English.

In order to teach sentences in English only, the disks 13, 14, 15, 16, 17, 18 and 19 are provided at their other faces with circularly arranged words 40 and the disks are turned upside down and reassembled in superimposed relation on the pivot 11 to permit of forming a radially disposed sentence adapted to appear in a slot 41 in a cover 42 held centrally on the pivot 11. This cover 42 is provided with a large cut-out portion 43 diametrically opposite the slot 41 to permit of gaining ready access to the different disks 13, 14, 15, 16, 17, 18 and 19, to turn the latter with a view to assemble the words for a predetermined sentence in the slot 41, as plainly indicated in Fig. 3. It will be noticed that a teacher can readily turn the disks so as to produce the desired sentence in the slot 41. Hence it is not necessary for the teacher to write such sentence out on the blackboard or similar device.

Although this device is primarily intended for the use of teachers, it is evident that it can be placed in the hands of a child to allow the latter to make sentences as instructed by the teacher or sentences of the child's own composition.

Having thus described my invention, I claim as new and desire to secure by Letters Patent:

1. An educational appliance for teaching a language, comprising a plurality of superimposed disks of different diameters to provide concentric bands each having printed thereon words disposed radially and spaced apart, the words being approximately of the same height, a pivot extending centrally through the disks for the latter to turn on, one independent of the others, and a reading cover overlying the said word disks and having a radial assembling and reading slot of length sufficient to unmask words upon the innermost to the outermost concentric bands, and of a width corresponding approximately to the height of the said words to allow of assembling a line of words upon the concentric bands forming a sentence in register with the slot on correspondingly turning the disks, the said cover having a second slot disposed diametrically opposite the said assembling and reading slot.

2. An educational appliance for teaching a foreign language, comprising a plurality of superimposed disks of different diameters to provide concentric bands each having printed thereon in one-half portion words in one language and in the other half portion words in another language, a word diametrically opposite another being a translation thereof, the words being approximately of the same height and disposed radially, a pivot extending centrally of the said disks for the latter to turn on independent one of the other, and a cover overlying the said disks and having diametrically opposite slots of length sufficient to unmask words upon the innermost to the outermost concentric bands and of a width corresponding approximately to the height of the said words to allow of assembling lines of words upon the concentric bands forming complementary sentences in the two languages in register with diametrically opposite slots.

JOHN H. FROME.